United States Patent [19]

Higashi et al.

[11] Patent Number: 4,563,917
[45] Date of Patent: Jan. 14, 1986

[54] TWO STAGE KICKDOWN CONTROL SYSTEM FOR A MOTOR VEHICLE AUTOMATIC TRANSMISSION

[75] Inventors: Haruki Higashi; Kouichirou Waki; Masaru Fukuiri; Kazuo Yukitomo, all of Hiroshima, Japan

[73] Assignee: Mazda Motor Corporation, Hiroshima, Japan

[21] Appl. No.: 655,723

[22] Filed: Sep. 28, 1984

[30] Foreign Application Priority Data

Sep. 30, 1983 [JP] Japan .................. 58-183779

[51] Int. Cl.$^4$ .................. B60K 41/06
[52] U.S. Cl. .................. 74/866; 74/865; 74/871; 74/877
[58] Field of Search .................. 74/865, 866, 870, 871, 74/877; 364/424.1

[56] References Cited

U.S. PATENT DOCUMENTS

| | | | |
|---|---|---|---|
| 3,653,281 | 4/1972 | Shirai et al. | 74/866 X |
| 3,673,892 | 7/1972 | Kato et al. | 74/870 |
| 3,733,930 | 5/1973 | Mizote | 74/866 |
| 3,785,224 | 1/1974 | Will | 74/865 |
| 4,034,627 | 7/1977 | Mizote | 74/866 |
| 4,142,613 | 3/1979 | Iijima | 74/866 X |
| 4,369,676 | 1/1983 | Gaus | 74/870 X |
| 4,391,165 | 7/1983 | Gaus | 74/865 X |

FOREIGN PATENT DOCUMENTS

| | | |
|---|---|---|
| 56-53137 | 12/1981 | Japan . |
| 2054772 | 2/1981 | United Kingdom .................. 74/870 |
| 2057602 | 4/1981 | United Kingdom . |

Primary Examiner—William F. Pate, III
Assistant Examiner—Dwight G. Diehl
Attorney, Agent, or Firm—Fleit, Jacobson, Cohn & Price

[57] ABSTRACT

A vehicle automatic transmission including a torque converter, a multiple stage transmission gear mechanism connected with the torque converter and a hydraulic control circuit for automatically selecting one of gear stages of the transmission gear mechanism. The hydraulic control circuit includes a kickdown control device which functions to shift down the gear mechanism when the engine control foot pedal is substantially fully depressed. Depending on the vehicle running condition, the kickdown control device shifts down the gear mechanism by two gear stages. The hydraulic circuit includes control circuit which functions to shift down the gear mechanism at first by one gear stage and then by a further one stage after a certain time delay when a two stage shift down is required.

11 Claims, 5 Drawing Figures

TWO STAGE KICKDOWN CONTROL SYSTEM FOR A MOTOR VEHICLE AUTOMATIC TRANSMISSION

BACKGROUND OF THE INVENTION

1. Field of the Invention

The present invention relates to a motor vehicle automatic transmission and more particularly to a control of a motor vehicle automatic transmission. More specifically, the present invention pertains to a control of an automatic transmission having a hydraulic torque converter and a multiple-stage transmission gear mechanism.

2. Description of Prior Art

Conventional automatic transmissions for motor vehicles include a torque converter and a multiple-stage transmission gear mechanism connected with the torque converter to be driven thereby. The gear mechanism generally has three forward drive stages and one reverse drive stage. In recent automatic transmissions such as the one disclosed by the published U.K. patent application No. 2,057,602, there is arranged an overdrive gear mechanism between the torque converter and the transmission gear mechanism so that an overdrive gear stage is additionally provided. The transmission is provided with a hydraulic control system for selecting an appropriate one of the gear stages in accordance with the vehicle operating conditions, such as the engine output and the vehicle speed.

As one of control modes performed by the control system, there is provided a kick-down control wherein the gear mechanism is shifted down to a lower gear stage when an engine control member such as an engine throttle valve actuating member is moved to a substantially full power position. In an automatic transmission having such kickdown control mode, there is a possibility that the gear mechanism be shifted down from the highest gear stage by two stages when the engine control member is actuated for a kick down control. Such two stage shift down is not preferable because there will be produced an uncomfortable shock. Japanese patent publication No. 56-53137 discloses a vehicle automatic transmission control system in which a two stage shift down is prevented. According to the control system proposed by the Japanese publication, when the manual shift lever is moved from the "D" position to the "2" position with the gear mechanism in the fourth or overdrive stage, the gear mechanism is at first shifted down to the third stage and then to the second stage. It should however be noted that the proposed control system deals only with the shift down control under an operation of the manual control lever so that it does not solve the problem of shift down shock under a kick down control.

OBJECT OF THE INVENTION

It is an object of the present invention to provide a vehicle automatic transmission control system which can prevent shift down shock in two stage shift down under a kick down control.

Another object of the present invention is to provide a vehicle automatic transmission control system in which gear stages are shifted down stepwisely when two stage shift down is required.

A further object of the present invention is to provide a vehicle automatic transmission including a transmission gear mechanism having a first through third gear stages and an overdrive gear stage, a control system for the gear mechanism having a kick down control mode in which shift down is carried out from the overdrive gear stage at first to the third gear stage and then to the second gear stage when it is required to shift down from the overdrive to gear stage to the second gear stage.

SUMMARY OF THE INVENTION

According to the present invention, the above and other objects can be accomplished by a vehicle automatic transmission including a hydraulic torque converter, a transmission gear mechanism connected with the torque converter and having at least three gear stages of different gear ratios for forward drive, friction means for selecting one of said gear stages, kick down control means comprising first shift down circuit means for controlling said friction means so that the transmission gear mechanism is shifted down from a higher gear stage to a lower gear stage, kick down solenoid means provided in said first shift down circuit means for controlling said first shift down circuit means and kick down switch means adapted to be actuated by an engine control member when the engine control member is moved substantially to a full power position to thereby control said kick down solenoid means to effect a shift down from a higher gear stage to a lower gear stage, shift down control means comprising second shift down circuit means for controlling said friction means so that the transmission gear mechanism is shifted down from a highest gear stage to a next higher gear stage, shift down solenoid means provided in said second shift down circuit means for controlling said second shift down circuit means and shift down switch means adapted to be actuated by the engine control member when the engine control member is moved to a position spaced a predetermined distance from said full power position so that said shift down switch means is actuated earlier than said kick down switch means when the engine control member is moved toward said full power position to thereby control said shift down solenoid means to a shift down from the highest gear stage to the next higher gear stage, time delay means responsive to an actuation of said shift down switch means and delaying operation of said kick down solenoid means for a predetermined time when the kick down switch means is actuated after the actuation of said shift down switch means.

With the arrangements described above, when the gear mechanism is to be shifted down by two gear stages from the highest gear stage for kick down control, one stage shift down is at first made to the next higher gear stage and after the predetermined time a further one stage shift down is made. It is therefore possible to avoid any shock due to a two stage shift down.

In a preferable aspect of the present invention, the transmission gear mechanism comprises a multiple stage gear unit having at least three gear stages and an overdrive gear unit for providing an overdrive gear stage as the highest gear stage. Means may be provided for operating the kick down solenoid means immediately when the kick down switch means actuated when the vehicle speed is above a predetermined value.

BRIEF DESCRIPTION OF THE DRAWINGS

The above and other objects and features of the present invention will become apparent from the following descriptions of a preferred embodiment taking reference to the accompanying drawings, in which.

DESCRIPTIONS OF THE PREFERRED EMBODIMENT

Basic Structure of the Transmission

Figure 1:
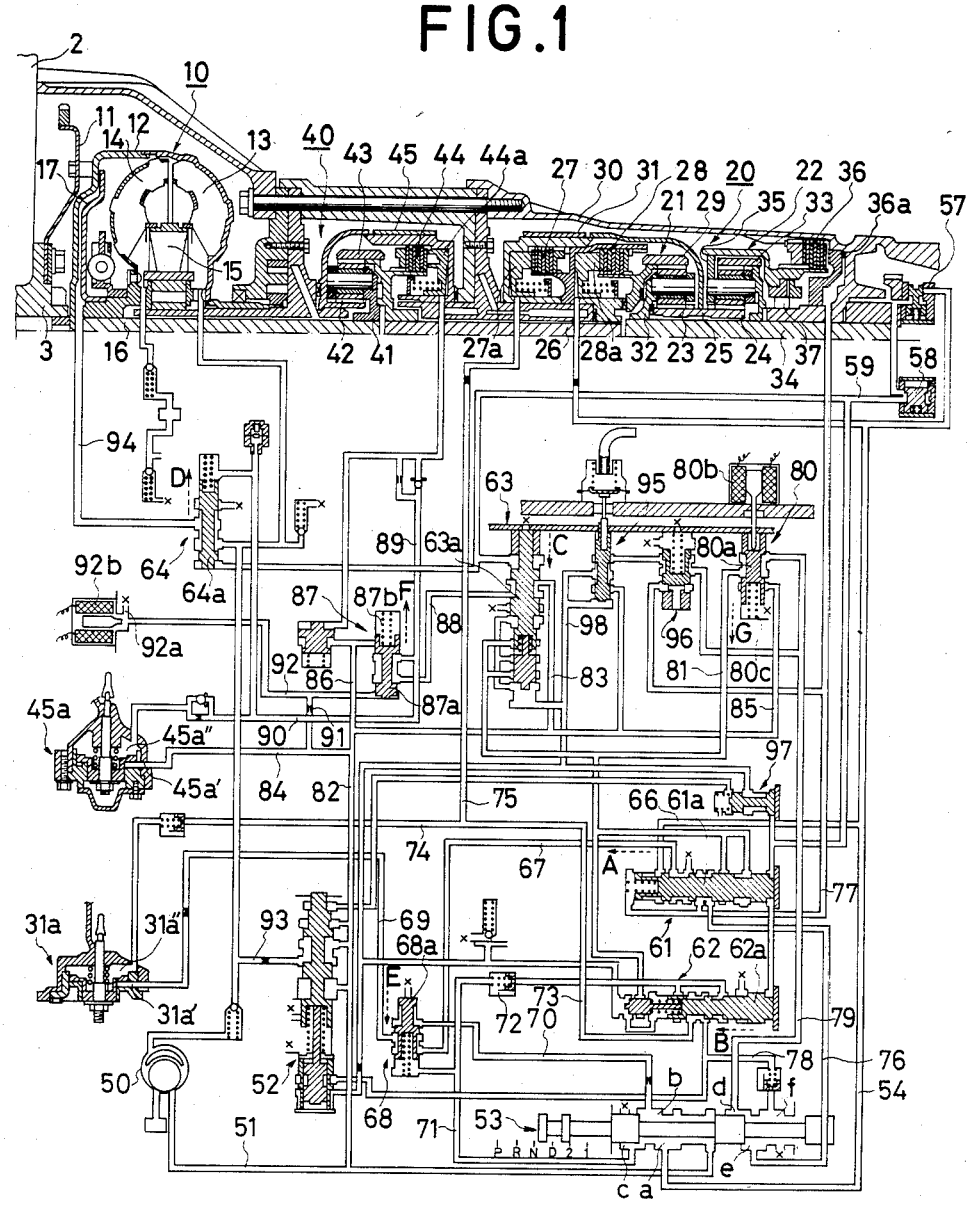
FIG. 1 is a sectional view of a vehicle automatic transmission embodying the features of the present invention.

Referring to the drawings, particularly to FIG. 1, there is shown an automatic transmission which comprises a hydraulic torque converter 10, a multiple stage transmission gear mechanism 20, and a planetary gear type over-drive transmission mechanism 40 arranged between the torque converter 10 and the multiple stage transmission gear mechanism 20.

The torque converter 10 has a pump 13 connected with an output shaft 3 of an engine 2 through a drive plate 11 and a converter casing 12, a turbine 14 provided in the casing 12 to face to the pump 13 and a stator 15 disposed between the pump 13 and the turbine 14. A converter output shaft 16 is connected with the turbine 14. A lock-up clutch 17 is provided between the converter output shaft 16 and the casing 12 which is connected to the pump 13. The lock-up clutch 17 is normally engaged with the casing 12 under a pressure of hydraulic fluid which circulates in the torque converter 10, and is released by a hydraulic pressure, which is drawn to a space between the casing 12 and the clutch 17 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mechanism 20 has an input shaft 26 connected through a front clutch 27 with the connecting rod 25 and through a rear clutch 28 with an internal gear 29 of the front planetary gear unit 21. A front break 31 is provided between the connecting rod 25 or the sun gears 23, 24 of the gear units 21 and 22 and a casing 30 of the transmission. The gear mechanism 20 also has an output shaft 34 connected with a planetary carrier 32 of the front planetary gear unit 21 and an internal gear 33 of the rear planetary gear unit 22. The rear planetary gear unit 22 has a planetary carrier 35, and there are provided between the planetary carrier 35 and the transmission casing 30 a rear brake 36 and a one-way clutch 37.

The planetary gear type over-drive transmission mechanism 40 includes planetary gears 41a, a planetary carrier 41 rotatably carrying the planetary gears 41a and connected with the output shaft 16 of the torque converter 10, a sun gear 42 engaged with the planetary gears 41a, and an internal gear 43 which is also engaged with the planetary gears 41a and connected with the sun gear 42 through a direct connecting clutch 44. An over-drive brake 45 is provided between the sun gear 42 and the transmission casing 30. The internal gear 43 is connected with the input shaft 26 of the multiple stage transmission gear mechanism 20.

The multiple stage transmission gear mechanism 20 is of known type and can provide three forward driving gear stages and one reverse stage. The planetary gear type over-drive transmission mechanism 40 connects the shafts 16 and 26 directly when the direct connection clutch 44 is engaged and the brake 45 is released, and provides an over-drive connection between the shafts 16 and 26 when the brake 45 is engaged and the clutch 44 is released.

Hydraulic Control Circuit

The above-mentioned automatic transmission is provided with a hydraulic control circuit as shown in FIG. 1. The hydraulic control circuit has an oil pump 50 which is driven by the engine output shaft 3 through the torque converter 10. Hydraulic oil is discharged under pressure from the pump 50 into a pressure line 51. The oil pressure is reduced by a pressure regulating valve 52 and applied to a select valve 53. The select valve 53 has a plunger which can be selectively positioned in one of shift positions 1, 2, D, N, R and P. When the select valve 53 is positioned in the position D, the pressure line 51 is communicated with the ports a, b and c of the select valve 53. In the position 2, the pressure line 51 is communicated with the ports a, b and d of the select valve 53 whereas in the position 1, the line is communicated with the ports a, d and e. In the position R, the line 51 is communicated with the ports d, e and f. The port a is communicated through a line 54 with a hydraulic actuator 28a for the rear clutch 28. It will therefore be understand that when the select valve 103 is positioned in anyone of the positions D, 2 and 1, the actuator 28a makes the rear clutch 28 engage.

The line 54 from the port a is connected with a second governor valve 57 which is provided on the output shaft 34 of the transmission gear mechanism 20. The second governor valve 57 has an output port connected with a first governor valve 58 which is also provided on the output shaft 34. The first governor valve 58 has an output port connected with a governor pressure line 59. The governor valves 57 and 58 produce a governor pressure which is substantially proportional to the rotating speed of the output shaft 34. The governor pressure line 59 is connected with a 1-2 shift valve 6, a 2-3 shift valve 62, a 3-4 shift valve 63 and a lock-up valve 64 to apply the governor pressure to these valves so that spools 61a, 62a, 63a and 64a of these valves are forced respectively in the directions shown by arrows A, B, C and D.

The port a is also communicated through a line 66 branched from the line 54 with the 1-2 shift valve at a port which is communicated with a line 67 when the spool 61a is shifted in the direction of the arrow A under the governor pressure introduced at the right hand end of the spool 61a. The line 67 is led to a second lock valve 68 having a spool 68a which is biased upward by means of a spring. With the select valve 53 in the position D, hydraulic pressure is applied from the ports b and c through lines 70 and 71 respectively to the second lock valve 68 and the hydraulic pressure functions to maintain the spool 68a in the upward position shown in FIG. 1. In this position of the spool 68a, the line 67 is communicated with line 69 leading to an engaging port 31a' of an actuator 31a for the front brake 31. It will thus be understood that when the spool 61a of the 1-2 shift valve 62 is moved in the direction shown by the arrow A, hydraulic pressure is led to the engaging port 31a' of the actuator 31a to make the front bake 31 engage.

The line 71 from the port c of the select valve 53 is connected through an orifice check valve 72 with the 2-3 shift valve 62 at a port which is connected with a line 73 when the spool 62a is moved in the direction of the arrow B under the governor pressure applies to the right hand end of the spool 62a. The line 73 is branched to lines 74 and 75, the line 74 being connected with a release port 31a'' of the actuator 31a for the front brake 31 and the line 75 with an actuator 27a for the front clutch 27. It will therefore be understood that the front brake 31 is released and the front clutch 27 is engaged when the spool 62a of the 2-3 shift valve 62 is moved to the left position under the governer pressure.

The port c of the select valve 53 is disconnected from the pressure line 51 when the select valve 53 is in the position 2. Since the port b is still in communication with the pressure line 51, the spool 68a of the second lock valve 68 is moved in the direction shown by an arrow E to thereby connect the line 69 with the line 70. Thus, hydraulic pressure is introduced through the lines 70 and 69 to the engaging port 31a' of the actuator 31a to make the front brake 31 engage irrespective of the position of the spool 61a of the 1-2 shift valve 61.

The port e is communicated with the pressure line 51 when the select valve 53 is in either one of the positions 1 and R. The port e is connected through a line 76 to the 1-2 shift valve 61 at a port which is communicated with a line 77 when the spool 61a is in the right position as shown in FIG. 1. Thus, in this position of the spool 61a, the rear brake 36 is engaged under a hydraulic pressure applied through the line 77 to an actuator 36a.

The select valve 53 further has a port f which is communicated with the pressure line 51 when the select valve 53 is in the position R. The port f is connected through a line 78 with the 2-3 shift valve 62 at a port which is communicated with the line 73 when the spool 62a is in the right position shown in FIG. 1. Thus, hydraulic pressure is applied in the position R to the actuator 27a to engage the front clutch 27. The hydraulic pressure is also applied to the release port 31a'' of the actuator 31a, however, the pressure does not provide any change in the actuator 31a because it is already in the release position since it is not supplied with hydraulic pressure at the engaging port 31a' in the position R of the select valve 53.

The port of which is in communication with the pressure line 51 in anyone of the positions 2, 1 and R is connected with a line 79 leading to a kick down valve 80. The valve 80 has a spool 80a which is biased upward by a spring 80c and actuated by a kick down solenoid 80b. In the upward position of the spool 80a, the valve 80 connects the line 79 with a line 81 which leads to the 1-2 shift valve 61, the 2-3 shift valve 62 and the 3-4 shift valve 63. When hydraulic pressure is applied from the line 81, spools 61a, 62a and 63a of the valves 61, 62 and 63 are maintained in the positions shown in FIG. 1.

The pressure line 51 is further connected with a branch line 82 which leads through lines 83, 84, 85 and 86 respectively to the 3-4 shift valve 63, an engaging port 45a' of an actuator 45a for the overdrive brake 45, the kick down valve 80 and an overdrive release valve 87. The line 83 leading to the 3-4 shift valve 63 is communicated through a line 88 with the overdrive release valve 87 when the spool 63a of the shift valve 63 is in the position shown in FIG. 1. The line 88 is communicated, when the spool 87a of the valve 87 is in the position shown in FIG. 1, through lines 89 and 90 respectively with an actuator 44a for the direct drive clutch 44 and a release port 45a'' of the actuator 45a for the overdrive brake 45. It will therefore be understood that, in the positions of the valves shown in FIG. 1, the direct drive clutch 44 is engaged and the overdrive brake 45 is released. When the spool 63a of the 3-4 shift valve 63 is moved in the direction of the arrow c under the governor pressure, the line 83 is disconnected from the line 88 and the line 88 is opened to the drain port. Therefore, the pressure is released from the actuator 44a and the release port 45a'' of the actuator 45a so that the direct drive clutch 44 is released and the overdrive brake 45 is engaged.

The line 86 leading to the overdrive release valve 87 is normally closed by the spool 87a of the valve 87 as shown in FIG. 1. When the spool 87a is moved in the direction shown by an arrow F, the line 86 is communicated with the lines 89 and 90 to thereby engage the direct drive clutch 44 and release the overdrive brake 45. In order to effect the aforementioned movement of the spool 87a, the line 84 is connected with the lower end portion of the spool 87a through a line 92 which has an orifice 91. The line 92 has a drain port 92a provided with a normally open solenoid valve 92b. It will therefore be understood that the line 92 is normally opened to the drain port 92a so that the spool 87a of the valve 87 is held in the position shown in FIG. 1 under the influence of a spring 87b. When the solenoid valve 92b is energized to closed the drain port 92a, a pressure build up in the line 92 so that the spool 87a is shifted in the direction of the arrow F.

The line 85 leading to the kick down valve 80 is normally closed by the spool 80a of the valve 80. The spool 80a of the kick down valve 80 is shifted in the direction of an arrow G when the solenoid 80b is energized and in the shifted position of the spool 80a the line 85 is connected with the line 81. As already described, the line 81 is in communication with the line 79 from the port d of the select valve 53 when the solenoid 80b is de-energized. The port d is opened to the drain port when the select valve 53 is in the position D so that no pressure is built up in this instance in the line 81. When the solenoid valve 80b is energized, however, the pressure is supplied from the line 85 to the line 81 and the pressure functions to hold the spools 61a, 62a and 63a of the shift valves 61, 62 and 63 in the positions shown in FIG. 1 when the spools are in the illustrated positions. When anyone or all of the spools 61a, 62a and 63a are in the positions shifted in the directions of the arrows A, B and C, the pressure in the line 81 counteracts the governor pressure applied to the spools and moves the spools to the illustrated positions when the pressure in the line 81 overcomes the governor pressure.

The pressure regulating valve 52 has a port which is connected to a line 93 leading to the lock-up valve 64 having a spool 64a. With the spool 64a in the position shown in FIG. 1, the line 93 is connected with a line 94 to supply a hydraulic pressure to the torque converter 10 to thereby force the lock-up clutch 17 toward the released position. As already described, the governor pressure is applied through the line 59 to the lower end of the spool 64a. Further, the pressure in the line 90 is applied to the upper end of the spool 64a. It will therefore be understood that as the governor pressure increases beyond a predetermined value, it overcomes the force applied by the pressure in the line 90 and causes the spool 64a to move in the direction of the arrow D. Thus, the line 94 is disconnected from the line 93 and opened to the drain port to thereby make the lock-up clutch 17 engage.

The hydraulic system further includes a vacuum throttle valve 95 for producing a throttle pressure which corresponds to the opening of the engine throttle valve. Further, there is provided a throttle back-up valve 96 for supplementing the vacuum throttle valve 95 and a pressure modifier valve 97 for modifying the output pressure of the valve 52. The throttle pressure from the valve 95 is led through a line 98 to the 2–3 shift valve 62 and the 3–4 shift valve 63 to force the spools 62a and 63a in the valves 62 and 63 in the directions opposite to the arrows B and C. In the structure described above, the relationship between the gear stages and the operations of the clutches 27, 28, 37 and 44 and the brakes 31, 36 and 45 is shown in Table.

valve opening greater than ⅞ of a full opening of the engine throttle valve. The shift down switch 106 is positioned so that it is closed at a position $P_2$ of the foot pedal 107 which is smaller in the stroke of the foot pedal 107 by a predetermined distance than the position $P_1$. For example, the position $P_2$ may correspond to a throttle opening of approximately 6/8 of the full opening.

The control circuit 100 has a control section 110 which includes a vehicle speed discriminating circuit 111 connected with the vehicle speed sensor 102 to receive a signal therefrom for producing a vehicle speed signal A which turns to a high level when the vehicle speed is below a predetermined value $V_o$, for example, 100 km/h. The vehicle speed signal A from the circuit 111 is applied to one of input terminals of an AND circuit 112. The other input terminal of the AND circuit 112 is connected through the shift down switch 106 and a main switch 121 with an electric power source 120. The AND circuit 112 produces an output signal C which turns to high level when the shift down switch 106 is closed and the vehicle speed is greater than the

TABLE

| SELECT VALVE | GEAR STAGE | FRONT CLUTCH 27 | REAR CLUTCH 28 | FRONT BRAKE 31 | REAR BRAKE 36 | ONE-WAY CLUTCH 37 | DIRECT DRIVE CLUTCH 44 | OVERDRIVE BRAKE 45 |
|---|---|---|---|---|---|---|---|---|
| P | | | | | | | o | |
| R | | o | | | o | | o | |
| N | | | | | | | o | |
| D | 1 | | o | | | o | o | |
|   | 2 | | o | o | | | o | |
|   | 3 | o | o | | | | o | |
|   | 4 | o | o | | | | | o |
| 2 | | | o | o | | | o | |
| 1 | 1 | | o | | o | | o | |
|   | 2 | | o | o | | | o | |

Figure 2:
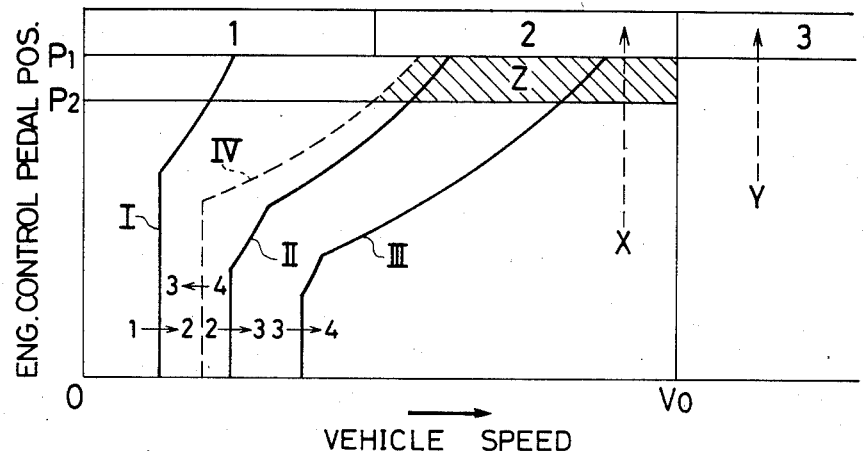
FIG. 2 is a diagram showing gear shift ranges as functions of the position of the engine control member and the vehicle speed.

In FIG. 2, there are shown shift lines wherein shiftings of gear stages are carried out. The solid line I designates the engine throttle valve opening P and the vehicle speed V wherein the transmission gear mechanism is shifted up from the first stage to the second stage. The solid lines II and III designate the shift up lines from the second to third and from the third to fourth stages, respectively. The dotted line IV designates the shift down line from the fourth stage to the third stage. Although not shown in the drawings, there are provided further shift down lines for shifting down from the third stage to the second stage and from the second stage to the first stage. The regions designated by 1, 2 and 3 are kick down zones wherein the gear mechanism is shifted down respectively to the first, second and third stages.

Kick Down Control Electric Circuit

Figure 4:
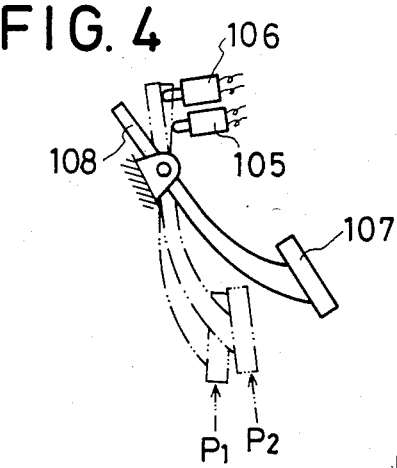
FIG. 4 is a side view showing arrangements of the engine control foot pedal and a shift down and kick down switches adapted to be actuated thereby; and, FIG. 5 is a diagram showing an operation of the electric circuit shown in FIG. 3.
Figure 3:
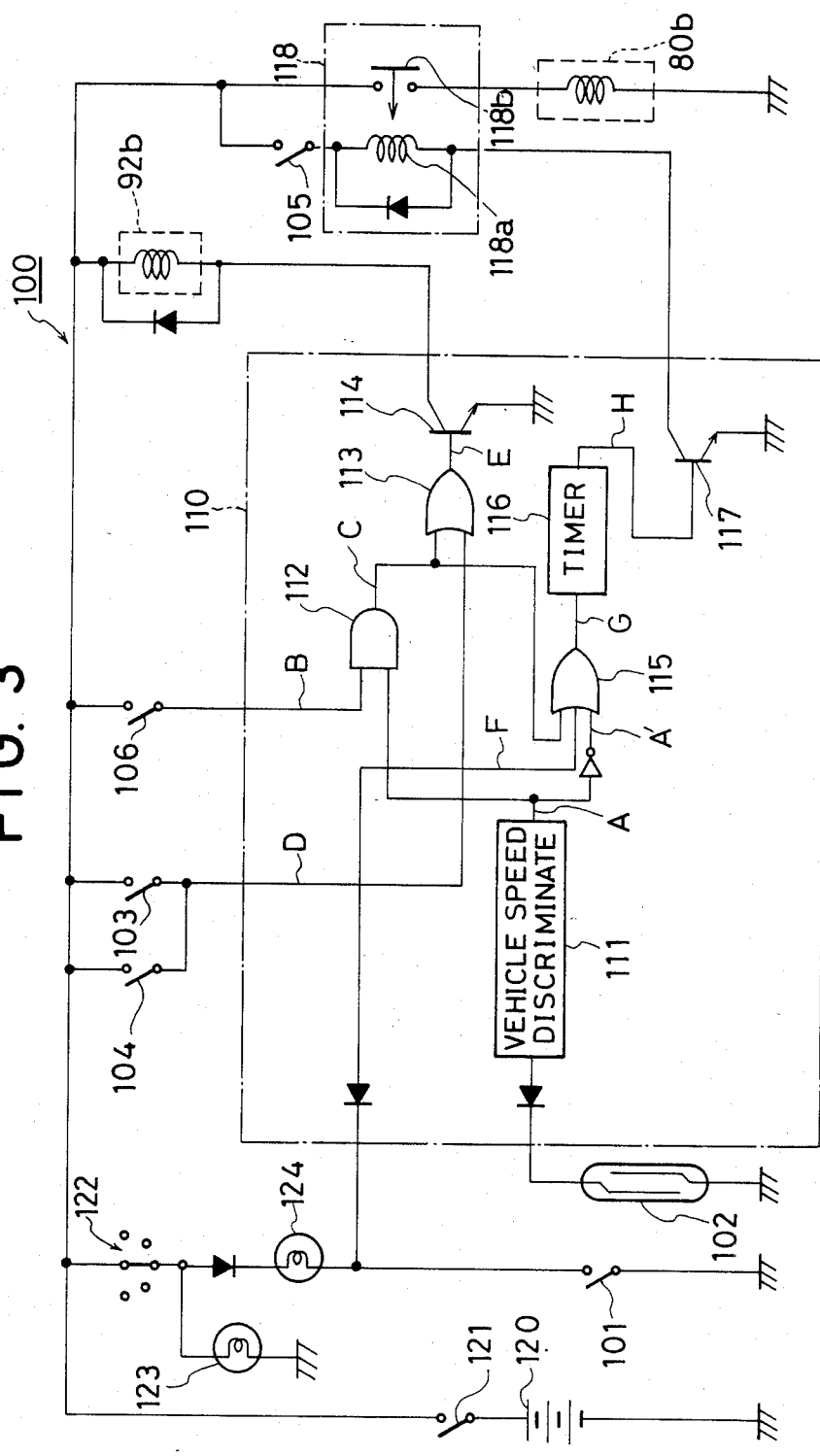
FIG. 3 is a circuit diagram showing the electric circuit for controlling the hydraulic circuit shown in FIG. 1.

Referring to FIG. 3, there is shown an electric control circuit 100 including a fourth gear stage switch 101 which is adapted to be closed when the transmission gear mechanism is in the fourth stage, a vehicle speed sensor 102 for detecting the vehicle speed, an engine cooling water temperature switch 103 which closes when the engine cooling water is below a predetermined temperature, an overdrive release switch 104 for manually releasing the overdrive, a kickdown switch 105 and a shift down switch 106. As shown in FIG. 4, the kickdown switch 105 and the shift down switch 106 are arranged so that they are actuated by an extension 108 of an engine control foot pedal 107. The kickdown switch 105 is positioned so that it is closed when the foot pedal 107 is depressed to a substantially full stroke position $P_1$ which may correspond to an engine throttle aforementioned predetermined value. The output of the AND circuit 112 is connected with one of input terminals of a first OR circuit 113 and one of input terminals of a second OR circuit 115. The other input terminal of the first OR circuit 113 is connected through the parallelly connected switches 103 and 104 and the main switch 121 with the power source 120. It will therefore be understood that when the engine cooling water temperature is below the aforementioned predetermined value or when the overdrive switch 104 is actuated, a high level signal D is applied to the first OR circuit 113.

The first OR circuit 113 produces an output E which turns to high level when one or both of the input terminals receive high level signals. The output of the first OR circuit 113 is connected with the base of a transistor 114 which has a collector connected with the overdrive release solenoid 92b. The emitter of the transistor 114 is grounded so that the transistor turns on when a high level signal is applied from the first OR circuit 113 to the base of the transistor 114. It will therefore be understood that, when the engine cooling water temperature is below the predetermined value or when the overdrive release switch 104 is actuated, the overdrive release solenoid 92b is energized to release the overdrive clutch 17. The solenoid 92b is also energized when the shift down switch 106 is closed and the vehicle speed is below the predetermined value $V_o$.

The second OR circuit 115 has another input terminal connected with the main switch 121 through an overdrive indicator switch 124 and a D range switch 122 which is closed when the select valve 53 is in the position D. A D range indicating light 123 is connected with the switch 122. The overdrive indicator switch 124 is grounded through the fourth gear stage switch 101. Thus, the second OR circuit 115 receives a signal F which is normally at a high level but turns to a low level when the switch 101 is closed. The second OR circuit 115 has a further input terminal which is connected through an inverter with the output of the vehicle speed discriminating circuit 111 to receive an inverted signal A' therefrom. It will therefore be understood that the second OR circuit 115 produces an output G which turns to a high level when the vehicle speed is higher than the predetermined value Vo or when the transmission gear mechanism is in the fourth stage with the select valve 53 in the position D. Further, the OR circuit 115 also produces a high level signal when the shift down switch 106 is actuated under the vehicle speed less than the predetermined value Vo.

The output of the second OR circuit 115 is connected through a timer 116 with the base of a transistor 117. There is provided a relay 118 which is connected through the main switch 121 with the power source 120. The relay 118 has a relay solenoid 118a connected at one end through the kick down switch 105 to the main switch 121 and at the other end to the collector of the transistor 117 of which emitter is grounded. The relay 118 has a relay contact 118b which is closed when the relay solenoid 118a is energized. The kickdown solenoid 80b is connected with the relay 118 so that it is energized when the relay contact 118b is closed. The transistor 117 is turned on when a high level signal H is received from the timer 116.

Operation

Assuming that the vehicle is running at a speed lower than the predetermined value Vo with the gear mechanism at the fourth stage and the engine control foot pedal 107 is depressed to a substantially full stroke position, the shift down switch 106 is at first closed and then the kickdown switch 105 is closed. The vehicle operating zone is then shifted from the fourth stage zone to the second stage kickdown zone as shown by an arrow X in FIG. 2. At this time, when the engine control pedal 107 is moved to a position between the positions $P_2$ and $P_1$ as shown by a shadowed zone Z in FIG. 2, the switch 106 is closed so that the output C of the AND circuit 112 is turned to high level so that the output E of the first OR circuit 113 is also turned to high level to make the transistor 114 conductive. Thus, the overdrive release solenoid 92b is energized and the gear mechanism is shifted down to the third stage.

Figure 5:
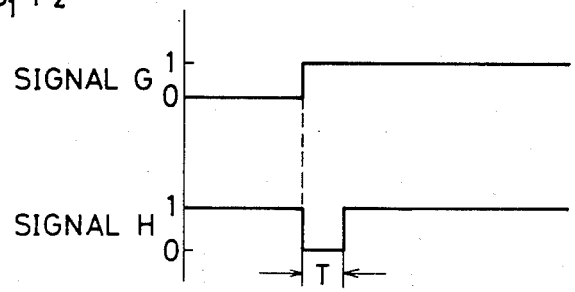

By this instance, the input signals A' and F to the second OR circuit 115 are at low level and, as soon as the output C of the AND circuit 112 is turned to high level, the output G of the second OR circuit 115 is turned to high level as shown in FIG. 5. The timer 116 then produces a low level signal H for a predetermined time T to turn the transistor 117 off and then produces a high level signal. Then, the kickdown solenoid 80b is energized after the delay time T since the kickdown switch 105 is already closed and the gear mechanism is shifted down to the second stage. It will therefore be understood that, in a kickdown operation from the fourth gear stage to the second gear stage, the gear mechanism is at first brought to the third gear stage so that a shift down shock can be prevented. When the engine control foot pedal 107 is held at a position between the positions $P_1$ and $P_2$, the gear mechanism is maintained at the third stage.

When the vehicle speed is higher than the value Vo, the AND circuit 112 receives a low level input from the circuit 111 so that the output C is maintained at low level even when the switch 106 is closed. The input signal A' to the second OR circuit 115 is at a high level so that a high level output is produced at the second OR circuit 115. The transistor 117 is therefore maintained in the conductive state, so that the kickdown solenoid 80b is energized when the kickdown switch 105 is closed. Thus, the gear mechanism is shifted down from the fourth stage to the third stage as shown by an arrow in FIG. 2.

When the gear mechanism is not in the fourth stage, the input signal F to the second OR circuit 115 is at high level so that the transistor 117 is maintained in the conductive state. Therefore, the kickdown solenoid 80b is energized immediately when the kickdown switch 105 is closed. In the illustrated embodiment, when the engine temperature is lower than the predetermined value or when the manual switch 104 is closed, a high level output is produced at the first OR circuit 113 to make the transistor 114 conductive. Thus, the overdrive release solenoid 92b is energized to release the overdrive clutch 17.

The invention has thus been shown and described with reference to a specific embodiment, however, it should be noted that the invention is in no way limited to the details of the illustrated arrangements but changes and modifications may be made without departing from the scope of the appended claims.

We claim:

1. A vehicle automatic transmission including a hydraulic torque converter, a transmission gear mechanism connected with the torque converter and having at least three gear stages of different gear ratios for forward drive, friction means for selecting one of said gear stages, kickdown control means comprising first shift down circuit means for controlling said friction means so that the transmission gear mechanism is shifted down from a high gear stage to a lower gear stage, kick down solenoid means provided in said first shift down circuit means for controlling said first shift down circuit means and kick down switch means adapted to be actuated by an engine control member when the engine control member is moved substantially to a full power position to thereby control said kick down solenoid means to effect a shift down from a high gear stage to a lower gear stage, shift down control means comprising second shift down circuit means for controlling said friction means so that the transmission gear mechanism is shifted down from a high gear stage to a next adjacent lower gear stage, shift down solenoid means provided in said second shift down circuit means for controlling said second shift down circuit means and shift down switch means adapted to be actuated by the engine control member when the engine control member is moved to a position spaced a predetermined distance from said full power position so that said shift down switch means is actuated earlier than said kick down switch means when the engine control member is moved toward said full power position to thereby control said shift down solenoid means to effect a shift down from a high gear stage to the next adjacent lower gear stage, time delay means responsive to an actuation of said shift down switch means for delaying operation of said kick down solenoid means for a predetermined time when the kick down switch means is actuated after the actuation of said shift down switch means.

2. A transmission in accordance with claim 1 which further includes vehicle speed detecting means for detecting vehicle speed and time delay disabling means for making the time delay means inoperative when the vehicle speed is greater than a predetermined value.

3. A transmission in accordance with claim 2 in which said vehicle speed detecting means includes vehicle speed discriminating means for producing a high level signal when the vehicle speed is lower than the predetermined value and a low level signal when the vehicle speed is higher than the predetermined value, AND gate means being provided and having inputs connected with said shift down switch means and said vehicle speed discriminating means, said AND gate means producing a signal when the vehicle speed is lower than the predetermined value and said shift down switch means is actuated to energize said shift down solenoid means.

4. A transmission in accordance with claim 3 in which said time delay disabling means includes OR gate means having a first input connected with said AND gate means and a second input connected with said vehicle speed discriminating means through inverter means, said OR gate means having an output connected with said time delay means.

5. A transmission in accordance with claim 3 in which said time delay disabling means includes OR gate means having a first input connected with said AND gate means, a second input connected with said vehicle speed discriminating means through inverter means, a second input connected with said vehicle speed discriminating means through inverter means, and a third input connected with a highest gear stage detecting means which produces a high level signal when the transmission gear mechanism is not in the highest gear stage and a low level signal when the transmission gear mechanism is in the highest gear stage, said OR gate means having an output connected with said time delay means.

6. A vehicle automatic transmission including a hydraulic torque converter, a transmission gear mechanism connected with the torque converter and having at least three gear stages of different gear ratios for forward drive, gear stage selecting means for selecting one of the gear stages, control means comprising first detecting means responsive to an engine control member for detecting that the engine control member is moved substantially to a full power position and producing a first signal, first shift down means responsive to said first signal for controlling said gear stage selecting means to shift down the transmission gear mechanism from a high gear stage to a lower gear stage, second detecting means responsive to the engine control member for detecting that the engine control member is moved to a position spaced a predetermined distance from said full power position and producing a second signal, second shift down means responsive to said second signal for controlling said gear stage selecting means to shift down the transmission gear mechanism from the high gear stage to a next adjacent lower gear stage, prohibiting means responsive to said second signal for prohibiting operation of said first shift down means for a predetermined time after the second signal is produced.

7. A transmission in accordance with claim 6 in which said prohibiting means includes delay means for delaying the first signal being applied to said first shift down control means for the predetermined time.

8. A transmission in accordance with claim 7 in which said delay means includes a timer.

9. A transmission in accordance with claim 6 in which said first detecting means and said first shift down means constitute kick down means.

10. A transmission in accordance with claim 6 which further includes vehicle speed detecting means for detecting vehicle speed and means for making the prohibiting means inoperative when the vehicle speed is greater than a predetermined value.

11. A vehicle automatic transmission including a hydraulic torque converter, a transmission gear mechanism connected with the torque converter and having at least three gear stages of different gear ratios for forward drive, gear stage selecting means for selecting one of the gear stages, control means comprising first detecting means responsive to an engine control member for detecting that the engine control member is moved substantially to a full power position and producing a first signal, first shift down means responsive to said first signal for controlling said gear stage selecting means to shift down the transmission gear mechanism from a high gear stage to a lower gear stage, second detecting means responsive to the engine control member for detecting that the engine control member is moved to a position spaced a predetermined distance from said full power position and producing a second signal, second shift down means responsive to said second signal for controlling said gear stage selecting means to shift down the transmission gear mechanism by one gear stage, prohibiting means responsive to said second signal for prohibiting operation of said first shift down means for a predetermined time after the second signal is produced.

* * * * *